United States Patent [19] [11] 4,441,598
Shepherd [45] Apr. 10, 1984

[54] MODULATED VISCOUS FAN DRIVE
[75] Inventor: Michael Shepherd, Carmel, Ind.
[73] Assignee: Wallace Murray Corporation, New York, N.Y.
[21] Appl. No.: 305,691
[22] Filed: Sep. 25, 1981

Related U.S. Application Data
[63] Continuation-in-part of Ser. No. 201,150, Oct. 27, 1980, abandoned.
[51] Int. Cl.³ .................... F16D 35/00; F16D 43/25
[52] U.S. Cl. ............................ 192/58 B; 192/82 T; 192/52
[58] Field of Search ............... 192/58 B, 82 T, 52
[56] References Cited
U.S. PATENT DOCUMENTS
3,059,745 10/1962 Tauschek ..................... 192/82 T
3,191,733 6/1965 Weir ............................ 192/82 T
4,007,819 2/1977 Maci ............................ 192/82 T Primary Examiner—Rodney H. Bonck
Assistant Examiner—James J. Merek
Attorney, Agent, or Firm—Thomas J. Greer, Jr.

[57] ABSTRACT

A shear fluid, temperature responsive fan drive coupling for the radiator cooling fan of an internal combustion engine. The drive coupling, conventionally, carries a temperature responsive valve which controls the degree of rotary coupling between the engine and the radiator cooling fan by controlling the quantity of shear fluid between a driving disc and a driven housing carrying the fan. The disc and the housing are parts of the coupling. The specific improvement of this invention relates to the provision of accumulator grooves in the walls of the drive chamber. These grooves allow an increase in the volume of shear (torque-transmitting) liquid in the coupling. The coupling exhibits modulated torque transmitting action in passing from partial to full engagement as temperature is varied.

4 Claims, 4 Drawing Figures

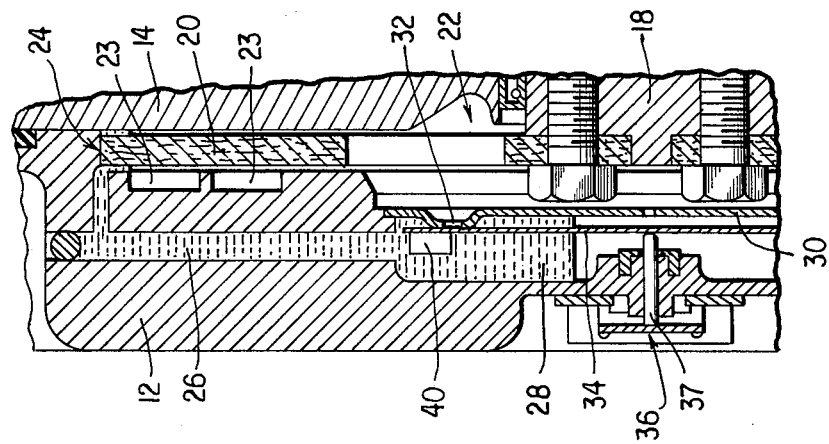
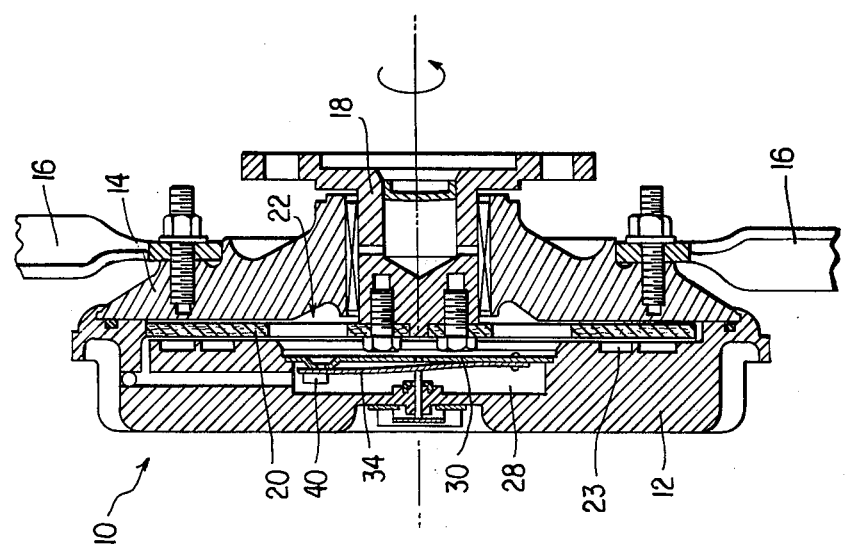

MODULATED VISCOUS FAN DRIVE

This is a continuation-in-part application of my co-pending application, Ser. No. 201,150, filed Oct. 27, 1980, now abandoned.

This invention relates to a viscous fluid fan drive coupling for the radiator cooling system of an internal combustion engine. Such fan drives are well known and usually include a rotary drive disc which is driven by the engine. The drive disc is rotatably mounted within a housing or casing, with the casing carrying fan blades. A quantity of viscous fluid, often termed a shear fluid, is admitted from a reservoir chamber to a drive chamber, the rotary disc being positioned in the drive chamber. Depending upon the amount of the shear fluid in the drive chamber, the degree of rotary coupling between the driving rotor and the fan is varied. This variance is usually controlled by a temperature responsive valve assembly, the valve opening to admit a larger quantity of fluid to the drive chamber when high cooling requirements are called for and closing to limit the degree of rotary coupling when lower cooling requirements exist. Such assemblies often include a shear fluid passageway between the radially outermost portion of the drive chamber in which the drive rotor is positioned and the reservoir chamber. The shear fluid is deflected so as to flow from the radially outermost part of the drive chamber through the passageway and thence returning to the reservoir chamber. Such devices are well known, and are presently classified in Class 192, sub-class 58 of the U.S. Patent Office classification. One such defice of this type is described in U.S. Pat. No. 4,007,819 to Maci of Feb. 15, 1977, assigned to the assignee of this invention. In general, such devices lower the power lost to the radiator cooling fan by correlating the fan power requirement with the engine cooling requirement at various ambient temperatures.

In most temperature controlled, viscous fan drives currently manufactured, the change from partial engagement or coupling to full engagement occurs very rapidly upon the attainment of a certain activating air temperature. Upon actuation of the temperature responsive valve assembly, there is a sharp or sudden change in output speed between the partially engaged condition and a fully engaged condition. While such a characteristic may be desirable for many applications there are certain other applications, such as farm tractors, which operate more effectively and more efficiently with a modulated engagement. The term "modulated" is here used to denote a gradual, stable change in fan speed as a function of cooling system requirements, as distinguished from an abrupt or rapid change.

As is already known in this art, (U.S. Pat. No. 3,191,733 to Weir) the change from partially engaged to fully engaged in a temperature responsive, viscous fan drive coupling for an internal combustion engine may be, in theory, modulated by placing a weight on the valve arm which opens and closes a port to control fluid communication between the reservoir chamber and the drive chamber. During operation of the fan drive, the weight and the fan are continuously rotating, thereby creating a centrifugal moment or force on this valve arm. Thus, not only is the opening or the closing of the usual valve port controlled by the air temperature, but is also controlled by rotary fan speed. Without the construction of this invention, such fan drive couplings are known to exhibit a sharp partially-engaged to fully-engaged characteristic for a fixed engine input speed acting on the input side of the fluid coupling. The modulating action on the valve arm is, according to this invention, significantly enhanced by the addition of fluid accumulator grooves on the walls of the drive chamber in which the drive rotor is positioned. These grooves add a time lag effect to the modulation action. Without the additional fluid volume provided by the fluid accumulator grooves, the drive would be significantly speed sensitive in that a slight change in position of the valve position would result in immediate filling or immediate emptying of the drive chamber.

IN THE DRAWINGS

FIG. 1 is a longitudinal cross-section of a portion of a viscous fluid, temperature controlled fan drive coupling for an internal combustion engine according to this invention.

FIG. 2 is an enlarged portion of FIG. 1 and illustrates the coupling (with fluid) in the partially engaged configuration.

Figure 3:
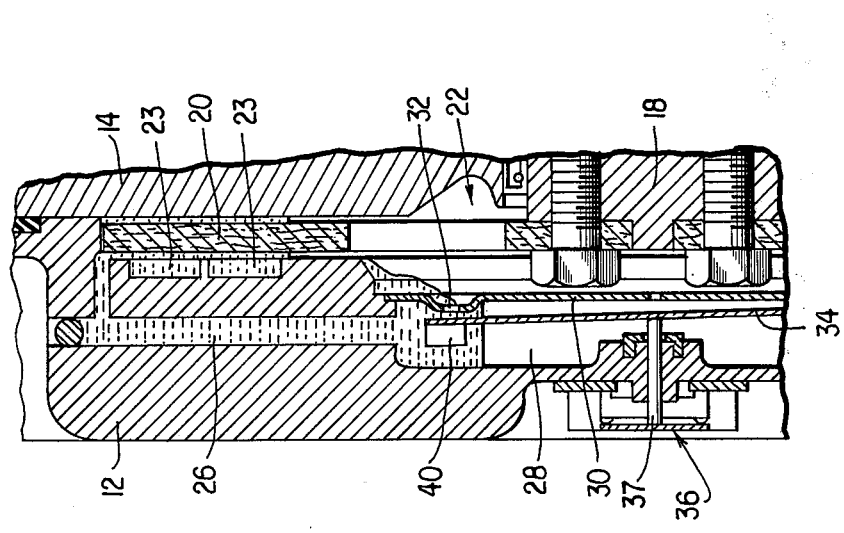
FIG. 3 is a view similar to FIG. 2, but shows the coupling in the full engaged configuration.

Referring now to FIGS. 1-3 of the drawings, the numeral 10 denotes generally the temperature controlled, viscous fluid fan coupling of this invention. At FIG. 1, the coupling is shown without viscous fluid. The coupling is usually positioned between the radiator and the engine block, with the radiator positioned towards the left of coupling 10 as viewed in FIG. 1, the engine block located to the right. Upon rotation of the coupling, which carries the usual radiator fan, the fan assists in drawing air from ambient through the radiator and towards the engine block.

The numeral 12 denotes a front housing section of the coupling while the numeral 14 denotes the rear section or half. The members 12 and 14 are held together suitably by fastening schemes well known in the art. The numeral 16 denotes the root portions of fan blades carried by the housing section 14 of the coupling. Thus, upon rotation of the housing 12, 14, the fan blades 16 rotate to draw air through the radiator and towards the engine block. The numeral 18 denotes a drive shaft element adapted to be coupled to the crankshaft of the engine or to a pulley driven by the crankshaft. Shaft 18 carries and is coupled to a drive disc or rotor 20, the disc rotating within a drive chamber 22 interiorly of coupling 10. Typically, chamber 22 is defined as a space between the two housing halves 12 and 14. The numeral 23 denotes any one of a plurality of annular grooves located on one wall portion of the drive chamber 22. They are shown on the housing half 12, but may be located on the wall portion of drive chamber 22 carried by rear housing half 14. These grooves are termed accumulator grooves and may, further, be located instead on one or both faces of drive disc 20. They are angularly continuous, i.e., extend 360°.

Turning now to FIGS. 2 and 3, the numeral 24 denotes generally the location of the usual dam (not shown) while the numeral 26 denotes the usual radially directed passage from the dam back to fluid reservoir chamber 28. The numeral 30 denotes the usual partition between the reservoir and drive chambers, often formed of sheet metal, and having a port or opening 32 therein. While not illustrated, the partition 30 is additionally provided with a bleed port adjacent port 32 to provide a continuous, small volume of fluid to wash the faces of the drive disc. This is conventional. The numeral 34 denotes the usual valve arm, the arm being contacted by a temperature responsive actuating element denoted generally by the numeral 36 having a valve arm actuating pin 37. The numeral 40 denotes a weight attached to the free end of valve arm 34, the weight 40 acting in a known manner.

The operation of the coupling shown at FIGS. 1-3 is as follows. Rotation of the crankshaft of the engine will cause rotation of drive shaft 18, and consequent rotation of drive disc 20. As drive disc 20 rotates within drive chamber 22, the disc will cause rotation of the entire housing 12, 14 by virtue of fluid friction or fluid drag with the surfaces of drive disc 20 which are in contact with the viscous shear fluid. The viscous fluid carried within drive chamber 22 is thrown radially outwardly and onto a dam located at 24. This is due to the pumping action of the rotor grooves and the higher rotational speed of the fluid in the drive chamber 22 than in the return passage 26. The dam causes the viscous fluid to flow through passage 26 flowing in a radially inwardly direction and thence return to reservoir chamber 28. In the event that very little rotation of the fan blades 16 is required for cooling the engine, the valve arm 34 will assume the position shown at FIG. 2 and there will be very little fluid passing from reservoir 28 through port 32 and into drive chamber 22. This will result in relatively slow rotation of the fan blades 16. The position of valve arm 34 is controlled by temperature sensing and actuating element 36 (of already known construction).

In the event that temperature conditions change and more cooling of the engine is required, the temperature sensing device 36 will act to allow valve arm 34 to assume the position shown in FIG. 3, thus opening the port 32 to allow viscous fluid to pass through the reservoir chamber 28 into the drive chamber 22. As shown at FIG. 3, with more viscous fluid in drive chamber 22, there will be a greater degree of rotary coupling between drive disc 20 and the housing 12, 14 which carries fan blades 16. Thus, in the position shown at FIG. 3, the coupling will deliver more cooling air to the engine. The weight 40 exerts a force, tending to move arm 34 to close the valve port 32, by virtue of centrifugal forces arising upon rotation of housing 12. This is known, as described at the top of column 7 of the Weir U.S. Pat. No. 3,191,733. While the addition of the weight 40, in theory, tends to modulate or make smoother the transition from full to partial fluid coupling, in practice its modulating effect is nil.

With the exception of the accumulator grooves 23, all elements above-described, together with their mode of operation, are already known in this art.

Figure 4:
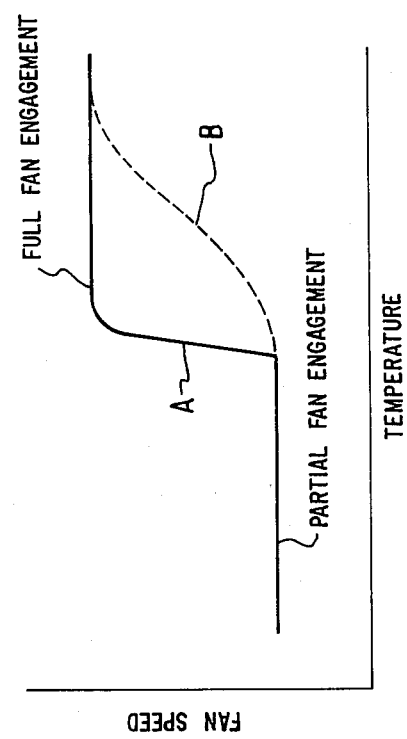
FIG. 4 shows a typical relationship between fan speed and temperature for both a prior art viscous fluid, temperature controlled fan coupling and for such a fan coupling constructed in accordance with this invention.

Referring now to FIG. 4 of the drawings, the curve denoted by A illustrates behavior typical for a prior art coupling of the type shown in FIGS. 1-3 with the exception of the grooves 23. Thus, without the accumulator grooves 23, the port 32 will open from the valve position of FIG. 2 with the result that full engagement (FIG. 3) will be obtained. The transition from partial to full engagement is seen to be sharp or abrupt. The curve denoted by B at FIG. 4 illustrates the behavior of the coupling shown at FIGS. 1-3 when the accumulator grooves 23 are present. The reader will note that the transition from partial to full fan engagement along path B is modulated, as compared to the abrupt or sharp behavior of curve A.

The explanation for the modulating behavior of this invention shown as path B of FIG. 4 is as follows.

The function of accumulator grooves 23 is to increase the volume of viscous shear fluid in the drive chamber 22 at the drive disc, without changing the geometric relationship between the input rotor and the output member. The distance between the input rotor and the sides of the drive chamber cannot be increased, to increase fluid volume, because such increase would substantially reduce torque transmitting capability. Without the accumulator grooves or annuli, the modulation behavior is not as pronounced, i.e., the transition from partial to full fan engagement is more abrupt, as shown at curve A of FIG. 3. Modulation may, theoretically, be realized by the addition of the weight 40 alone, without the accumulator annuli 23. However, the resulting modulation is not as controlled as with the annuli and is usually, in practice, not realizable. Attempts to realize the desired modulation, shown at B of FIG. 4, are made by varying the size of port 32. These attempts without the accumulator grooves 23 are typically not successful.

I claim:

1. A viscous fluid fan drive coupling of the known temperature responsive type adapted for use with the cooling system of an internal combustion engine, the fan drive coupling including a housing, the housing including a driving chamber and a reservoir chamber, a rotary drive disc received within the drive chamber and secured to a shaft rotatably mounted within the housing, the shaft rotating with operation of the engine, a viscous shear fluid within at least one of said driving and reservoir chambers, a thermally responsive device, and thermally responsive device varying the volume of viscous shear fluid in the drive chamber, the improvement comprising, the drive chamber being provided with at least one accumulator groove, said accumulator groove being located on a wall of the drive chamber, radially inwardly of the radially outermost portion of the drive chamber and radially outwardly of the radially innermost portion of the drive chamber, whereby the coupling action from partial engagement to full coupling is modulated.

2. The fan drive coupling of claim 1 wherein the housing includes a partition between the driving chamber and the rotary chamber, a fluid port in the partition, a valve arm carried by the coupling, the thermally sensitive device varying the position of the valve arm to open or close the port to thereby regulate the amount of shear fluid passing through the fluid port of the partition from the reservoir chamber to the drive chamber, a weight carried by the valve arm, the valve arm and weight being so positioned that the centrifugal force acting on the weight during rotation of the coupling urges the valve arm to close the port.

3. The coupling of claim 1 wherein said at least one accumulator groove is angularly continuous and is positioned on at least one side of the drive rotor.

4. The coupling of claim 2 wherein said at least one accumulator groove is angularly continuous and is positioned on at least one side of the drive rotor.

* * * * *